United States Patent [19]
Hasegawa

[11] Patent Number: 5,051,757
[45] Date of Patent: Sep. 24, 1991

[54] OPTICAL SCANNING WITH CYLINDRICAL LENS AND BEAM SLIT

[75] Inventor: Hirofumi Hasegawa, Osaka, Japan

[73] Assignee: Minolta Camera Kabushiki Kaisha, Osaka, Japan

[21] Appl. No.: 563,864

[22] Filed: Aug. 6, 1990

Related U.S. Application Data

[63] Continuation of Ser. No. 489,833, Mar. 2, 1990, abandoned, which is a continuation of Ser. No. 159,109, Feb. 23, 1988, abandoned.

[30] Foreign Application Priority Data

Feb. 23, 1987 [JP] Japan .................................. 62-39394

[51] Int. Cl.$^5$ ......................... G01D 15/16; H04N 1/21
[52] U.S. Cl. ..................................... 346/108; 358/296; 346/160
[58] Field of Search ................... 346/107 R, 108, 160; 358/296, 300, 302, 235, 480

[56] References Cited

U.S. PATENT DOCUMENTS

| | | | |
|---|---|---|---|
| 4,209,793 | 6/1980 | Ueno | 346/108 |
| 4,265,524 | 5/1981 | Compton | 346/108 |
| 4,270,149 | 5/1981 | Ohta et al. | 358/480 |
| 4,370,678 | 1/1983 | Kitamura | 358/480 |
| 4,764,776 | 8/1988 | Mugrauer | 346/108 |

FOREIGN PATENT DOCUMENTS

| | | |
|---|---|---|
| 0088555A1 | 9/1983 | European Pat. Off. . |
| 4928335 | 7/1972 | Japan . |
| 56-66815 | 6/1981 | Japan . |
| 59-214012 | 12/1984 | Japan . |

Primary Examiner—Mark J. Reinhart
Attorney, Agent, or Firm—Price, Gess & Ubell

[57] ABSTRACT

An optical scanning image forming apparatus having a photoreceptor member, an irradiating optical unit for modulating an optical beam from a beam source in accordance with image information and then for forming an image by scanning this modulated optical beam on the photoreceptor member, and an optical beam passing slit plate disposed in a path of the optical beam between the photoreceptor member and the irradiating optical unit, and a cylindrical lens having a positive power in one direction of a width of the optical beam passing slit plate. The cylindrical lens is disposed adjacent the slit plate and is capable by means of its converging effect of offsetting beam spreading-out due to diffraction of the slit plate. By impressing the slit plate with an electric potential of the same polarity as that of toner adhered to the photoreceptor member, it is possible to prevent adhesion of the toner to the slit plate.

19 Claims, 2 Drawing Sheets

OPTICAL SCANNING WITH CYLINDRICAL LENS AND BEAM SLIT

This is a continuation of application Ser. No. 489,833 filed on Mar. 2, 1990, now abandoned which is a continuation of Ser. No. 159,109, filed on Feb. 23, 1988 now abandoned.

BACKGROUND OF THE INVENTION

1. Field of the Invention

The present invention relates to an optical scanning image forming apparatus such as a laser beam printer, a laser COM system or the like, and more particularly to an optical scanning image forming apparatus comprising an irradiating optical unit for applying a modulated optical beam corresponding to image information onto a photoreceptor member while scanning the same, and an optical beam limiter interdisposed between the irradiating optical unit and the photoreceptor member and including an optical beam passing slit formed along a scanning direction of the optical beam.

2. Description of the Prior Art

In the case of a conventional optical scanning image forming apparatus of the above-noted type, the optical beam is regulated only by means of the optical beam limiter (e.g. European patent application published under No. 0088555A1). That is, according to the construction of the above apparatus, by causing only the optical beam having passed the optical beam passing slit to reach the photoreceptor member, even if the optical beam is scanned with its small vibrations normal to the scanning direction caused by tolerances of the irradiating optical unit, the construction is so arranged to prevent deviations of the image formed on the photoreceptor member in the scanning direction.

However, the above construction has drawbacks to be described hereinafter.

The beam passing the optical beam passing slit of the optical beam limiter is spread out by a diffracting effect of this slit. Therefore, in order to increase the scanning line density by reducing a diameter of the optical beam on the photoreceptor member, the optical beam passing slit, i.e. the optical beam limiter need be disposed adjacent the photoreceptor member.

More specifically, if the diameter of the optical beam normal to the scanning direction on the photoreceptor member and the distance between the optical beam limiter and the photoreceptor member are taken into consideration, a range within which there occurs no blurring in the image on the photoreceptor member due to the diffracting effect of the optical beam passing slit is given by $$l < W^2/80 \quad (1)$$

where l is a distance between the optical beam limiter and the photoreceptor member, W is a width of the optical beam passing slit, $\lambda$ is a wavelength of the optical beam.

And, within this range, we obtain $$d \sim \lambda \cdot l / W \quad (2)$$

where d is a blurring amount of the image on the photoreceptor member,

The diameter D of the optical beam normal to the scanning direction on the photoreceptor member (this diameter will be referred to hereinafter as a sub scanning direction beam diameter) is expressed by $$D = W + d \quad (3)$$

By using the above expressions (2) and (3) with the width W of the optical beam passing slit being a parameter, a relationship between the sub scanning direction beam diameter D and the distance l between the optical beam limiter and the photoreceptor member (will be referred to hereinafter as a clearance) may be obtained.

Taking for an example a semiconductor laser beam often used as the optical beam in this type of optical scanning image forming apparatus, the wavelength thereof given by $$\lambda = 780 \times 10^{-6}$$

When this equation is applied to the above expressions (2) and (3), a graph showing the above relationship is plotted in FIG. 6. In this graph, lines denoted by marks 'a' through 'd' respectively illustrate cases where the width W of the optical beam passing slit is 0.12 mm, 0.10 mm, 0.08 mm and 0.07 mm.

As seen from this graph, for obtaining a sub scanning direction beam diameter of 100 $\mu$m required for a printer having a resolving power of 400 dpi, even if the width W of the optical beam passing slit is 70 $\mu$m, the clearance l need be less than 3 mm.

On the other hand, in a typical image forming operation, there is a step of development in which a latent image formed on the photoreceptor member by the beam scanning operation is developed by selectively adhering toner thereto.

For this reason, in the conventional construction where the optical beam limiter and the photoreceptor member need be disposed adjacent each other, the toner on the photoreceptor member tends to inadvertently adhere to and thus soil the optical beam limiter. Especially, if the construction is so arranged that the toner to be removed from the photoreceptor member is collected by a cleaner attached to the developing device, the above tendency appears more conspicuously since the photoreceptor member with a considerable amount of toner being adhered thereto passes adjacent the optical beam limiter.

SUMMARY OF THE INVENTION

Therefore, it is the object of the present invention to provide an improved image forming apparatus capable of sufficiently preventing the scanning-direction wise deviations of the optical beam reaching the photoreceptor member without reducing the scanning line density and at the same time capable of minimizing the disadvantageous adhesion of the toner to the optical beam limiter.

In order to accomplish the above-noted object, according to the present invention, there is provided an optical scanning image forming apparatus comprising.

a photoreceptor member;

an irradiating optical unit for modulating an optical beam from a beam source in accordance with image information and then for forming an image by scanning this modulated optical beam on the photoreceptor member; and optical beam treatment means disposed in a path of the optical beam between the photoreceptor member and the irradiating optical unit, the optical beam treatment means including;

optical beam limiting means having an optical beam passing slit disposed along a scanning direction of the optical beam, and a light converging element such as a lens having a positive power in a direction of a width of the optical beam passing slit and disposed adjacent the optical beam limiting means.

According to the above construction, since the optical beam is converged by the positive power of the cylindrical lens in the direction of the width of the optical beam passing slit, this converging effect and the diffracting effect of the optical beam passing slit offset each other. Accordingly, it becomes possible to place the optical beam passing slit away from the surface of the photoreceptor member by a distance substantially corresponding to a focal length of the cylindrical lens.

As the result, the disadvantageous soiling of the optical beam limiter by the toner adhesion is reduced, and moreover, even if the limiter is soiled by the toner, the limiter may be readily cleaned since the same is sufficiently distant from the photoreceptor. Further, a cleaner or the like may be readily disposed in this space whereby an automatic cleaning operation may be facilitated. On the whole, it has become possible to minimize the soiling of the optical beam limiter for a long time period.

More specifically, the optical beam limiting means is formed of an electrically conductive material and on which an electric potential of the same polarity as that of the toner is impressed.

With this arrangement, it is possible to more effectively prevent the toner from inadvertently adhering to the optical beam limiter.

Other and further objects, features and advantages of the present invention will appear more fully from the following description.

BRIEF DESCRIPTION OF THE DRAWINGS

The accompanying drawings illustrate preferred embodiments of an optical scanning image forming apparatus related to the present invention, in which.

DESCRIPTION OF THE PREFERRED EMBODIMENTS

Preferred embodiments of the present invention will be particularly described hereinafter with reference to the accompanying drawings.

Figure 1:
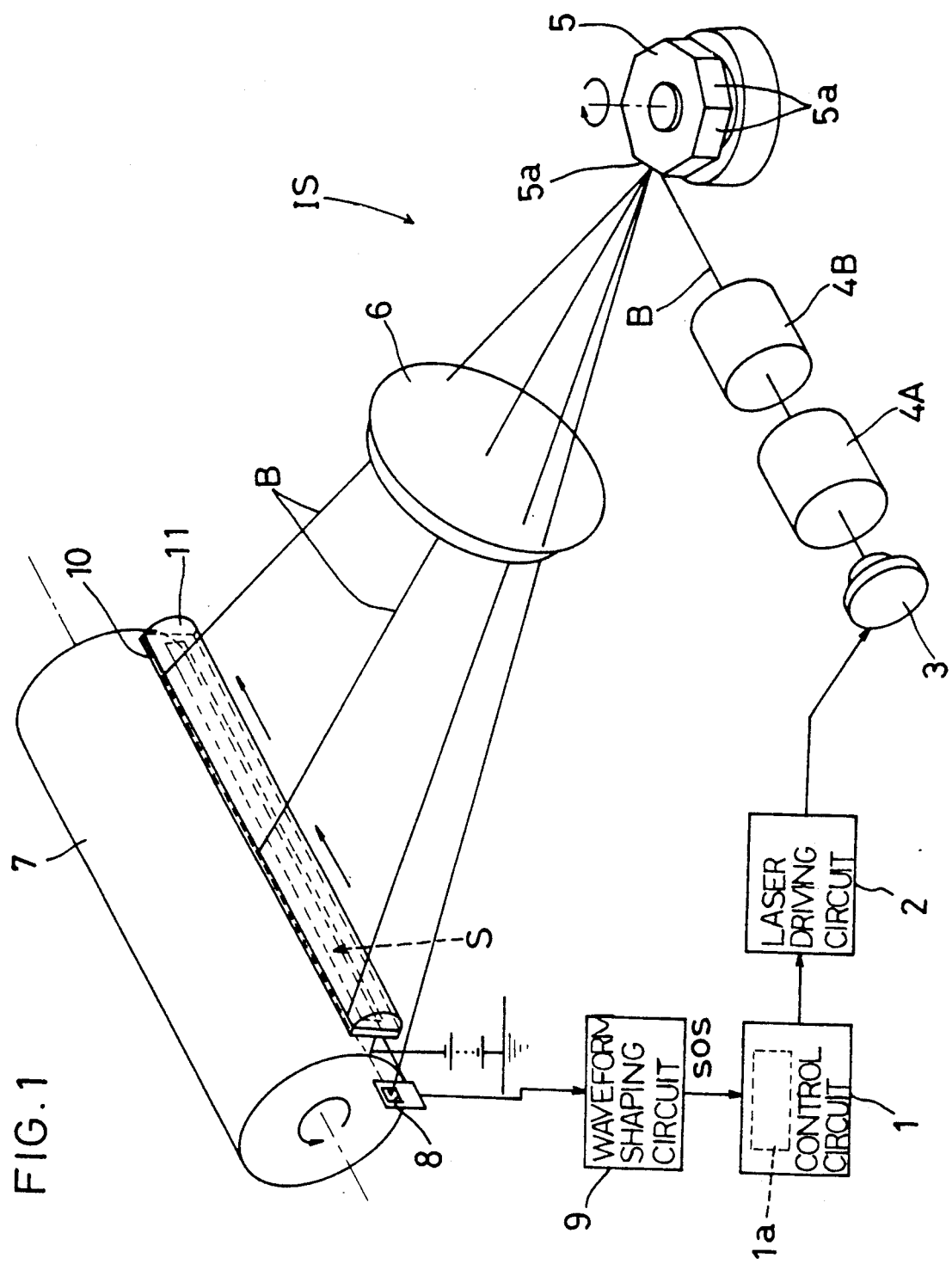
FIG. 1 is a view showing a schematic construction of the apparatus.

FIG. 1 shows a schematic construction of a laser beam printer as an example of an optical scanning image forming apparatus related to the present invention.

Image information to be recorded is picked up from an image memory 1a provided inside an image control circuit 1 and then input to a laser driving device 2. This laser driving device 2 generates an electric current to a semiconductor laser 3 for exciting the same based on the above image information. Then, the semiconductor laser 3 generates a laser beam B directly modulated by the current.

This laser beam B is transduced into a parallel light by a collimator lens 4A and shaped by a cylindrical lens 4B to have a vertically longitudinal elliptical cross section. Thereafter, the beam B is reflected by a certain reflecting face 5a of a high-speed rotating polygon mirror 5. The reflected laser beam B is projected by an fθ lens 6 to a photoreceptor drum 7 whose surface is uniformly charged, and depending on its intensity a charged potential of the image forming position is reduced.

The rotation of the polygon mirror 5 causes angular displacement between the reflecting face 5a and the laser beam B incident thereto. Thereby, the reflected laser beam B is scanned in the longitudinal direction of the photoreceptor drum 7 (a main scanning direction).

That is to say, the polygon mirror 5, fθ lens 6 and so on in sun constitute an irradiating optical unit IS for forming an image by scanning the laser beam B modulated in accordance with the image information on the photoreceptor drum 7.

On the other hand, the photoreceptor drum 7 is so constructed as to rotate at a constant speed in synchronization with the rotation of the polygon mirror 5 (the drum rotational direction comprises a sub scanning direction).

With this rotation of the photoreceptor drum 7, the above-described scanning operation of the laser beam B is repeated, whereby an electrostatic latent image in accordance with the image information is formed on the photoreceptor drum 7.

Thereafter, though not shown, this electrostatic latent image is developed by selectively adhering thereto toner which is a coloring pigment. Then, a recording paper is placed in contact with the toner carrying face thereby transferring the toner onto the face of the recording paper. Further, this toner is fused by heating on the paper, whereby a visible image is obtained on the recording paper.

Also, at an upstream side in the main scanning direction, there is provided a photosensor 8. This photosensor 8 generates an electrical current when the same is scanned by the laser beam B reflected by the polygon mirror 5. This electrical current is shaped by a waveform shaping circuit 9, and then after a predetermined time period, i.e. after the time period needed for the laser beam B to move from the position of the photosensor 8 to a recording start position on the photoreceptor drum 7, the shaped current is input as a synchronous signal SOS to the image control circuit 1.

By receiving this synchronous signal SOS, the image control circuit 1 starts reading one line image information from an image memory 1a incorporated therein. Then, receiving the image information picked up from the image memory 1a, the laser driving circuit 2 starts generating a current for exciting the semiconductor laser 3 based on the received information.

The above synchronous signal SOS is for making each of the record starting positions of scanning lines uniform in the rotational direction, i.e. the sub scanning direction of the photoreceptor drum 7.

That is to say, there are some manufacturing errors in angle dividing precisions of the respective reflecting faces 5a of the polygon mirror 5. Also, there occur vibrations attendant to the rotation or rotational irregularities of the polygon mirror 5. For these reasons, the scanning lines of the laser beam B are not always aligned in the sub scanning direction, which results in jitters in the recording.

Therefore, the above construction is so arranged that the recording jitters may be prevented by controlling the start of modulation of the laser beam B to be scanned on the photoreceptor drum 7 relative to the timing when the photosensor 8 has received the laser beam B.

Figure 2:
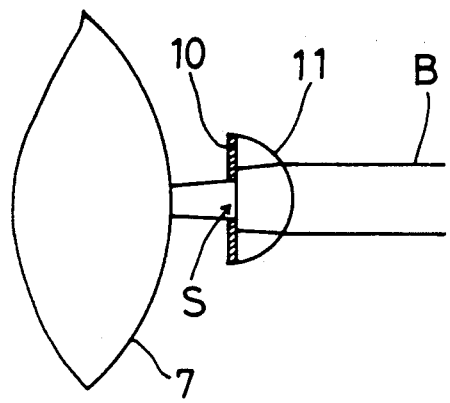
FIG. 2 is a sectional view showing a main portion of the apparatus shown in FIG. 1, FIGS. 3 through 5 are sectional views respectively showing alternate embodiments corresponding to FIG. 2.

On the other hand, as shown in FIG. 1 and FIG. 2, before the photoreceptor drum 7 there is provided optical beam treatment means. This optical beam treatment means includes optical beam limiting means 10 formed as a slit plate having an optical beam passing slit S elongated along the main scanning direction and a cylindrical lens 11 having a positive power only in the sub scanning direction, with the limiting means 10 and the cylindrical lens 11 being disposed adjacent each other.

The above optical beam passing slit S of the optical beam limiting means 10 is formed to be slightly smaller than the diameter in the sub scanning direction of the laser beam B. And, by causing only the laser beam B having passed this optical beam passing slit S to reach the photoreceptor drum 7, the beam deviations in the sub scanning direction is prevented.

That is to say, due to the manufacturing or mounting errors of the components of the irradiating optical unit IS, e.g. the polygon mirror 5 or the fθ lens 6, or due to the vibrations attendant to the rotation of the polygon mirror 5, the laser beam B is sometimes scanned with its deviations in the sub scanning direction, of which deviations result in deviations of the image in the sub scanning direction or in pitch irregularities in the main scanning line.

Because of the above reasons, in scanning the laser beam B having a vertically longitudinal elliptical cross section, its upper and lower portions are blocked by the optical beam limiting means 10 and only the rest portion of the beam B is permitted to pass the optical beam passing slit S, whereby the diameter and the pitch in the sub scanning direction of the laser beam B to reach the photoreceptor drum 7 are uniform.

Also, the cylindrical lens 11 disposed adjacent the optical beam limiting means 10 is adapted by its positive power in the sub scanning direction for converging the laser beam B in the sub scanning direction. This converging effect prevents the diameter of the laser beam B from being spread out in the sub scanning direction by the diffracting effect upon passing the optical beam passing slit S.

Accordingly, because no enlarging the diameter of the beam spot on the photoreceptor drum 7 occurs the optical beam limiting means 10 can be placed away from the surface of the photoreceptor drum 7 by a distance substantially corresponding to a focal length of the cylindrical lens 11, whereby the soiling of the optical limiting means 10 by the toner or the like is advantageously prevented.

Further, the optical beam limiting means 10 is formed of an electrically conductive material and is impressed with an electric potential of the same polarity as that of the charge toner used in developing the electrostatic latent image on the photoreceptor drum 7. With this arrangement, the soiling of the optical beam limiting means 10 due to the adhesion of the toner thereto is further effectively prevented.

The specific construction of the optical beam treatment means may be conveniently varied as will be described in the following few examples.

Figure 3:
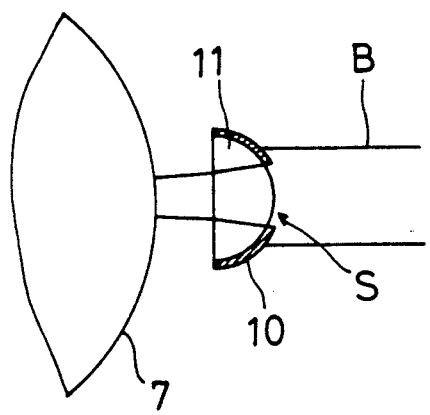

In a construction shown in FIG. 3, the cylindrical lens 11 is the same as that employed in the previous case; whereas, the optical beam regulating means 10 is disposed on the beam source side of the cylindrical lens 11. In this case, though not shown, if the cylindrical lens 11 has a transparent conductive layer coated thereon and electrically charged with the same polarity as that of the toner, in the same manner, the adhesion of the toner to the lens is effectively restricted.

Figure 4:
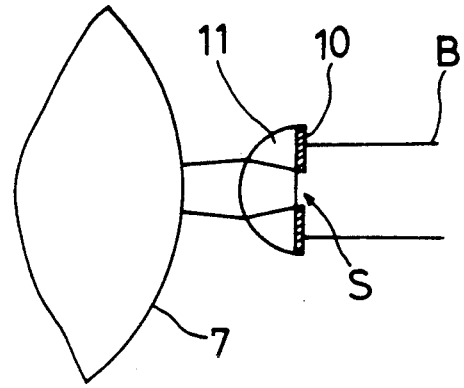

In a construction shown in FIG. 4, a flat face of the cylindrical lens 11 is directed towards the beam source; whereas, the optical beam limiting means 10 is positioned on the flat face of this cylindrical lens 11.

Figure 5:
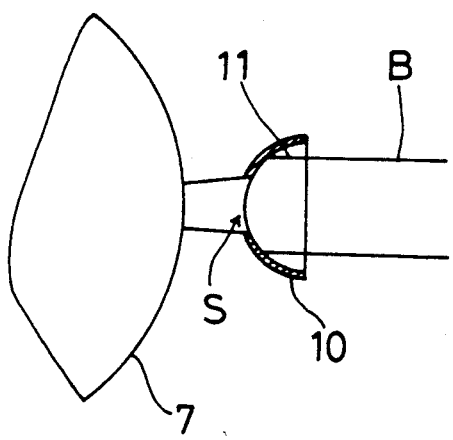
Figure 6:
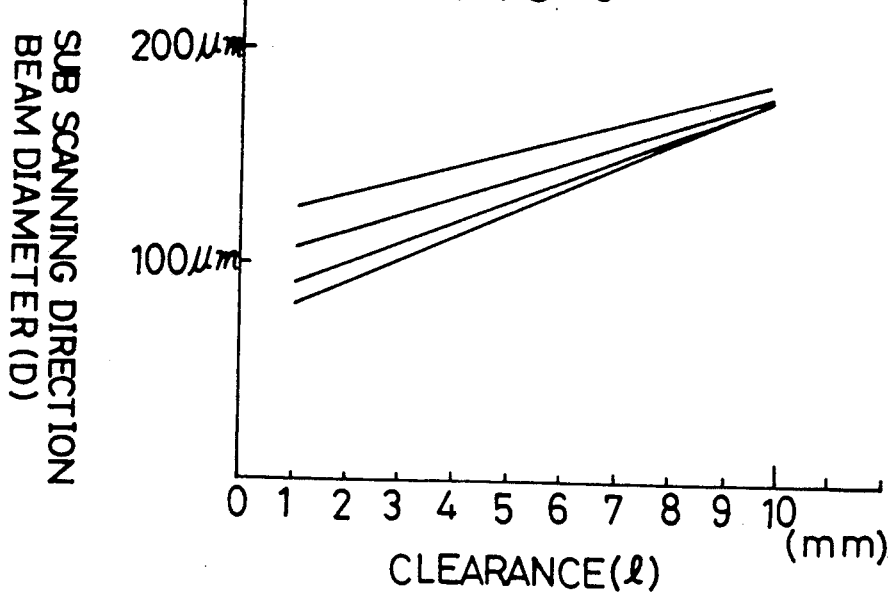
FIG. 6 is a graph showing a relationship of a diameter of an optical beam relative to a distance between an optical beam limiter and a photoreceptor member.

In a construction shown in FIG. 5, the cylindrical lens 11 has the same construction as that shown in FIG. 4; whereas, the optical beam limiting means 10 is positioned on a curved face of this cylindrical lens 11.

Furthermore, in the previous embodiment, the optical beam limiting means 10 and the cylindrical lens 11 are explained as being provided independently of each other. In place of this, it is also possible to incorporate these components into one in a manner that the optical beam limiting means 10 is formed as a light blocking film formed by evaporation on the surface of the cylindrical lens 11.

Further, in the previous embodiment, the cylindrical lens is used as an element for preventing the disadvantageous spreading-out of the optical beam due to the diffracting effect of the slit passage. In place of this, it is also possible within the scope of the present invention to utilize a light converging element e.g. a concave mirror.

The optical scanning image forming apparatus related to the present invention is illustrated in the previous embodiment by way of example of the indirect type laser beam printer in which the electrostatic latent image is formed by scanning the laser beam B on the photoreceptor drum 7 and then this electrostatic latent image is developed and transferred onto the recording paper. In place of this, the optical scanning image forming apparatus related to the present invention includes a direct type laser beam printer in which the image is directly recorded on a particular recording paper by an image forming scanning operation of the laser beam B. Further, the optical scanning image forming apparatus related to the prsent invention further includes within its scope, in addition to the above-noted laser beam printers, a laser COM system in which a micro image is impressed on a micro film, a laser imager in which a CT image is impressed on a silver salt film, and so on.

What is claimed is:

1. An optical scanning image forming apparatus comprising:
    a photoreceptor member;
    a laser beam generating unit which generates a laser beam which is modulated according to image information;
    scanning means for scanning the laser beam across the photoreceptor member;
    a mask member extending along a length of the photoreceptor member with a slit disposed adjacent to the photoreceptor member in a path of the laser beam, said slit being arranged along a scanning direction of the laser beam and having a width slightly smaller than the diameter of the laser beam so as to limit the laser beam which reaches the photoreceptor member by blocking any deviated portion of the laser beam relative to the dimension of the slit, and a cylindrical lens having a positive power in a direction perpendicular to the scanning direction and disposed adjacent to and along the length of the mask member, the power of said cylindrical lens converging the laser beam so as to compensate for any beam spreading caused by the slit.

2. An optical scanning image forming apparatus as claimed in claim 1, wherein said mask member is disposed on the scanning means side of said cylindrical lens.

3. An optical scanning image forming apparatus as claimed in claim 1, wherein said mask member is disposed on the photoreceptor member side of said cylindrical lens.

4. An optical scanning image forming apparatus as claimed in claim 1, wherein said mask member and said cylindrical lens are formed independently of each other.

5. An optical scanning image forming apparatus as claimed in claim 1, wherein said mask member and said cylindrical lens are formed integratedly of each other.

6. An optical scanning image forming apparatus as claimed in claim 5, wherein said mask member comprises a light-blocking film formed by evaporation on said cylindrical lens.

7. An optical scanning image forming apparatus as claimed in claim 2, wherein said cylindrical lens has on the photoreceptor side thereof a transparent conductive layer and electrically charged with the same polarity as that of toner adhered to said photoreceptor member.

8. An optical scanning image forming apparatus as claimed in claim 3, wherein said mask member is formed of an electrically conductive material and said limiting means is impressed with an electric potential of the same polarity as that of toner adhered to said photoreceptor member.

9. An optical scanning image-forming apparatus that is capable of providing an image to be realized with an electrically charged toner, comprising:
a photoreceptor member;
a modulated optical beam;
means for scanning the beam across the photoreceptor member;
means for limiting the amount of beam impinging on the photoreceptor in a direction perpendicular to the direction of the scanning including means for compensating for any diffraction effect caused by the limitation on the beam, and
means for providing an electrical charge on the limiting means of approximately the same charge as the toner to repulse the toner.

10. The optical scanning image-forming apparatus of claim 9 wherein the means for limiting the beam comprises a mask with a slit therein, said slit being disposed along the direction of the scanning and the compensating means comprises a converging lens.

11. The optical scanning image-forming apparatus of claim 10 wherein the compensation means comprises a cylindrical lens and the mask is affixed to one side of the cylindrical lens.

12. An optical scanning image forming apparatus as claimed in claim 11, wherein said mask member is affixed to one side of said cylindrical lens.

13. An optical scanning image forming apparatus comprising:
a photoreceptor member;
means for producing an optical beam;
means for modulating the optical beam from the producing means in accordance with image information and for forming an image by scanning the modulated optical beam on said photoreceptor member, and
optical beam treatment means disposed in a path of the optical beam between said photoreceptor member and said producing means, said optical beam treatment means including optical beam limiting means having an optical beam passing slit disposed along a scanning direction of the optical beam, and a cylindrical lens having a positive power in a direction of a width of said optical beam passing slit and disposed adjacent said optical beam limiting means.

14. An optical scanning image forming apparatus comprising:
a photoreceptor member;
means for producing an optical beam;
an irradiating optical unit for modulating an optical beam from the producing means in accordance with image information and then for forming an image by scanning the modulated optical beam on said photoreceptor member, and
optical beam treatment means disposed in a path of the optical beam between said photoreceptor member and said irradiating optical unit, said optical beam treatment means including optical beam limiting means having an optical beam passing slit disposed along a scanning direction of the optical beam, and a light converging element for converging the beam so as to offset any spreading out of the optical beam by diffraction of the optical beam passing through said slit.

15. An optical scanning image forming apparatus as claimed in claim 14, wherein said light converging element is disposed between the photoreceptor member and said optical beam limiting means.

16. An optical scanning image forming apparatus as claimed in claim 14, wherein said light converging element is formed of a dielectric material and said light converging element is electrically charged with the same polarity as that of a toner to adhere to said photoreceptor member.

17. An optical scanning image-forming apparatus comprising:
a photoreceptor member;
a modulated optical beam;
means for scanning the beam across the photoreceptor member;
means for limiting the amount of beam impinging on the photoreceptor in a direction perpendicular to the direction of the scanning, and
means for compensating for any diffraction effect caused by the limiting means.

18. The optical scanning image-forming apparatus of claim 17 wherein the means for limiting the beam comprises a mask with a slit therein, said slit being disposed along the direction of the scanning and the compensating means comprises a converging lens.

19. The optical scanning image-forming apparatus of claim 18 wherein the compensation means comprises a cylindrical lens and the mask is affixed to one side of the cylindrical lens.

* * * * *